(12) United States Patent
Nishimura (10) Patent No.: US 8,805,138 B2
(45) Date of Patent: Aug. 12, 2014

(54) METHOD OF MANUFACTURING OPTICAL PATH CHANGE OPTICAL CONNECTOR, AND OPTICAL PATH CHANGE CONNECTOR

(75) Inventor: Akito Nishimura, Sakura (JP)

(73) Assignee: Fujikura Ltd., Tokyo (JP)

( * ) Notice: Subject to any disclaimer, the term of this patent is extended or adjusted under 35 U.S.C. 154(b) by 363 days.

(21) Appl. No.: 12/879,685

(22) Filed: Sep. 10, 2010

(65) Prior Publication Data

US 2011/0064353 A1  Mar. 17, 2011

(30) Foreign Application Priority Data

Sep. 11, 2009  (JP) ................................ 2009-210431

(51) Int. Cl.
*G02B 6/26* (2006.01)
(52) U.S. Cl.
USPC ............................................................ 385/39
(58) Field of Classification Search
None
See application file for complete search history.

(56) References Cited

U.S. PATENT DOCUMENTS

| | | | |
|---|---|---|---|
| 5,708,743 A * | 1/1998 | DeAndrea et al. | 385/88 |
| 6,888,593 B1 * | 5/2005 | Nakamura et al. | 349/96 |
| 7,726,885 B2 * | 6/2010 | Nishimura et al. | 385/78 |
| 2009/0092356 A1 * | 4/2009 | Yasuda et al. | 385/31 |

FOREIGN PATENT DOCUMENTS

| | | |
|---|---|---|
| JP | 2004-240220 A | 8/2004 |
| JP | 2005-55796 A | 3/2005 |
| JP | 2006-126754 A | 5/2006 |
| JP | 2007-121973 A | 5/2007 |
| JP | 2008-9098 A | 1/2008 |
| JP | 2009-103998 A | 5/2009 |

OTHER PUBLICATIONS

Japanese Office Action for Japanese Application No. 2009-210431 dated Mar. 26 2013 with English translation.
Japanese Office Action for Japanese Application No. 2009-210431 Oct. 31, 2012.

* cited by examiner

*Primary Examiner* — Uyen Chau N Le
*Assistant Examiner* — Hoang Tran
(74) *Attorney, Agent, or Firm* — Sughrue Mion, PLLC (57) ABSTRACT

A method of manufacturing an optical path change optical connector, the method including: resin-molding a core part, the core part including an optical-fiber-hole-formed portion having an optical fiber hole, and a positioning structure portion for positioning the core part with respect to the circuit board; inserting an optical fiber into the optical fiber hole; and over-molding the core part with light-transmitting resin, covering a front end face of the optical-fiber-hole-formed portion and forming an inclined internal reflective surface opposite to the front end face of the optical-fiber-hole-formed portion, such that the inclined internal reflective surface is positioned to reflect light between the optical fiber inserted into the optical fiber hole and an optical element disposed on a circuit board on which the core part is mounted.

5 Claims, 8 Drawing Sheets

METHOD OF MANUFACTURING OPTICAL PATH CHANGE OPTICAL CONNECTOR, AND OPTICAL PATH CHANGE CONNECTOR

BACKGROUND OF THE INVENTION

1. Field of the Invention

The present invention relates to a method of manufacturing an optical path change optical connector, and an optical path change optical connector.

Priority is claimed on Japanese Patent Application No. 2009-210431 filed on Sep. 11, 2009, the contents of which are incorporated herein by reference.

2. Description of the Related Art

Figure 13:
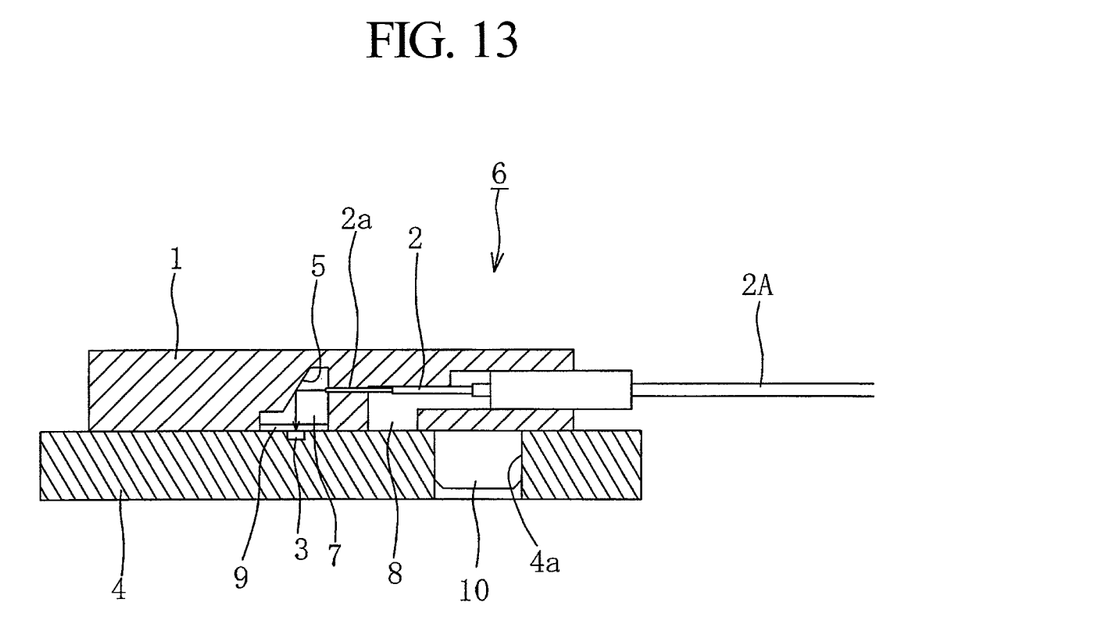
FIG. 13 is a cross-sectional view of a conventional optical path change optical connector provided on a circuit board.

An optical path change optical connector for inputting and outputting an optical signal between an optical fiber and an optical element on a circuit board is shown in FIG. 13 (Japanese Unexamined Patent Application, First Publication No. 2009-103998). In this optical path change optical connector 6, an optical fiber 2 is introduced into a resin-molded optical connector body 1 in parallel with a circuit board 4 having an optical element 3 mounted thereon, and a 45° inclined reflective surface 5 is formed at the front of a front end of the optical fiber 2 in the optical connector 6.

Light output from an optical fiber (bare fiber) 2a is changed 90° in its direction by the reflective surface 5 and is incident to the optical element 3.

The reflective surface 5 is formed on a forward inclined wall surface of a recess 7 formed at a front end of the optical fiber 2a in the optical connector body 1. A reference numeral 2A indicates an optical fiber ribbon, 2 indicates an optical fiber strand constituting the optical fiber ribbon 2A, and 2a indicates an optical fiber (bare fiber) obtained by removing a cladding of the optical fiber strand. The optical fibers 2 and 2a are fixed by a transparent adhesive, which is filled through an adhesive filling window 8. The recess 7 is filled with the transparent adhesive and sealed with transparent glass 9. An anti-reflective (AR) coating (AR film) is generally formed on a surface of the transparent glass 9 in order to prevent light loss due to light output from the optical element 3 being reflected from the surface of the transparent glass 9. The optical connector body 1 has a fitting pin 10 fitted into a positioning hole 4a formed in the circuit board 4.

Thus, the optical connector 6 described in Japanese Patent Publication, First Publication No. 2009-103998 requires the task for filling the recess 7 with the transparent adhesive and sealing the recess 7 with the transparent glass 9. This makes the assembly task cumbersome. Further, the number of parts increases due to the use of the transparent glass 9 for sealing. Accordingly, the optical connector becomes expensive.

The present invention has been achieved in view of the above circumstances, and it is an object of the present invention to provide an optical path change optical connector capable of overcoming complexity of the assembly and being manufactured at a low cost.

SUMMARY OF THE INVENTION (1) According to an aspect of the present invention, there is provided a method of manufacturing an optical path change optical connector, the method including: resin-molding a core part, the core part including an optical-fiber-hole-formed portion having an optical fiber hole, and a positioning structure portion for positioning the core part with respect to the circuit board; inserting an optical fiber into the optical fiber hole; and over-molding the core part with light-transmitting resin, covering a front end face of the optical-fiber-hole-formed portion and forming an inclined internal reflective surface opposite to the front end face of the optical-fiber-hole-formed portion, such that the inclined internal reflective surface is positioned to reflect light between the optical fiber inserted into the optical fiber hole and an optical element disposed on a circuit board on which the core part is mounted.

In the method of manufacturing an optical path change optical connector described in (1), the core part includes the optical-fiber-hole-formed portion and the positioning structure portion for positioning the core part with respect to the circuit board. Accordingly, when this core part is accurately formed of a resin material having high rigidity, an optical path change optical connector with high positioning accuracy is obtained.

Further, the core part can have a simple outer shape, thus facilitating high accuracy molding.

Further, when the optical fiber is inserted into the resin pre-molded core part and the light-transmitting resin is over-molded, the internal reflective surface for directing the optical path of the optical fiber to the optical element is formed. Accordingly, an assembly process of filling transparent adhesive in the recess and sealing the recess with the transparent glass, as in the conventional optical connector, is unnecessary. Thus, the complexity of the assembly of the optical path change optical connector can be overcome and an inexpensive optical path change optical connector can be obtained.

(2) According to an aspect of the present invention, there is provided an optical path change optical connector including: a core part disposed on a circuit board, the core part including: an optical-fiber-hole-formed portion having an optical fiber hole into which an optical fiber is inserted, and a positioning structure portion for positioning the core part with respect to the circuit board; and a light-transmitting resin portion which is over-molded over the core part and the optical fiber inserted into the optical fiber hole of the optical-fiber-hole-formed portion, wherein the light-transmitting resin portion covers a front end face of the optical-fiber-hole-formed portion, and includes an internal reflective surface disposed opposite to the front end face of the optical-fiber-hole-formed portion, wherein the internal reflective surface is inclined and positioned to reflect light between the optical fiber and the optical element; and an input and output surface that faces the optical element.

(3) In the case of (2), the input and output surface of the light-transmitting resin includes a fine uneven structure configured to suppress reflection.

According to the optical path change optical connector described in (3), the fine uneven structure is formed on the input and output surface of the light-transmitting resin. Thus, it is possible to prevent light loss due to reflection of light output from the optical element.

Also, since this fine uneven structure can be simultaneously formed when the light-transmitting resin is over-molded, a separate member, i.e., transparent glass anti-reflectively coated through a complicated process is unnecessary.

(4) In the case of (2), the input and output surface of the light-transmitting resin portion may include a collimator lens portion formed thereon.

(5) In the case of (2), the input and output surface of the light-transmitting resin portion may include a focusing lens portion formed thereon.

When the collimator lens portion or the focusing lens portion is formed on the input and output surface of the light-transmitting resin portion as in (4) or (5), an output light beam can be prevented from being diffused. As a result, a sufficiently high optical coupling efficiency between the optical fiber and the optical element can be obtained.

(6) In the case of (2), the front end face of the optical-fiber-hole-formed portion of the core part is within a recess portion of the core part that is recessed with respect to front end faces of the positioning structure portions disposed at both sides of the optical-fiber-hole-formed portion, and the light-transmitting resin portion is over-molded within at least the recess portion of the core part.

In the optical connector in which the recess is formed on the front end face of the optical-fiber-hole-formed portion in the core part and the light-transmitting resin is over-molded in the recess as in (6), the positioning structure portions can be provided at both sides of the front end position of the optical fiber, which are suitable as positions of the positioning structures.

DETAILED DESCRIPTION OF THE INVENTION

Figure 1:
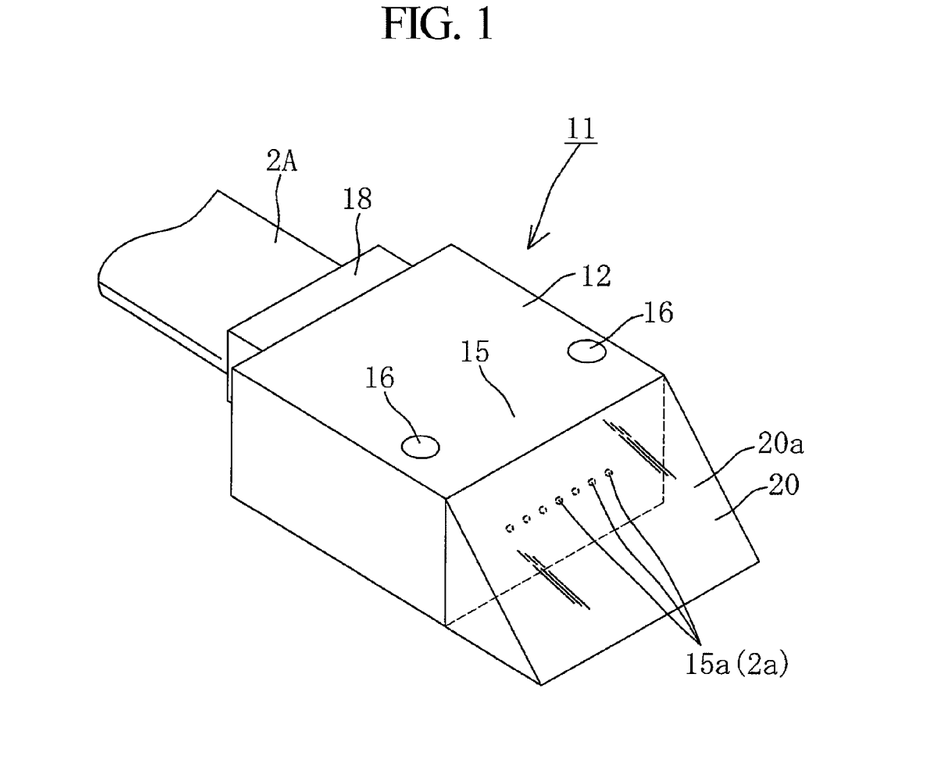
FIG. 1 is a perspective view of an optical path change optical connector according to a first embodiment of the present invention.
Figure 2:
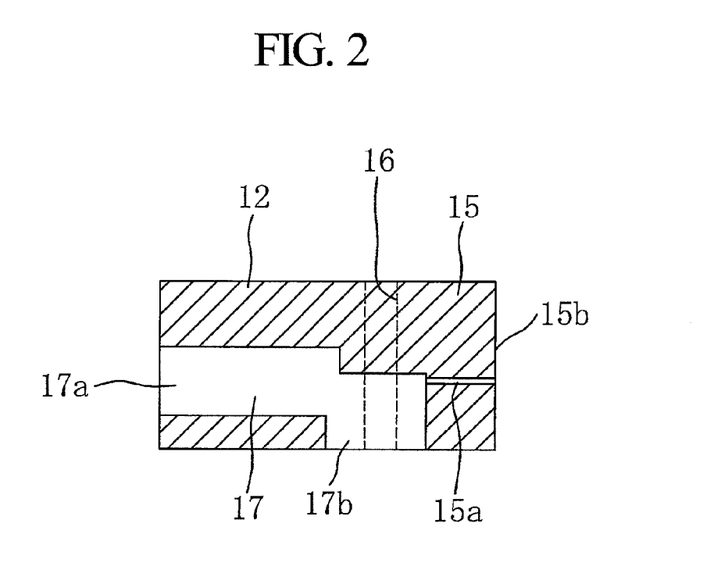
FIG. 2 is a cross-sectional view of a core part in the optical path change optical connector of FIG. 1.
Figure 3:
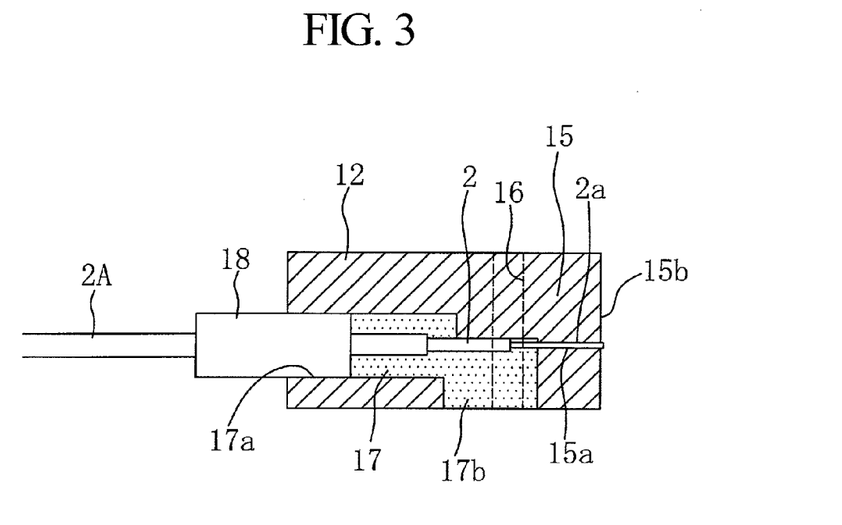
FIG. 3 is a cross-sectional view of the core part of FIG. 2 having an optical fiber inserted thereinto and fixed thereto.
Figure 4:
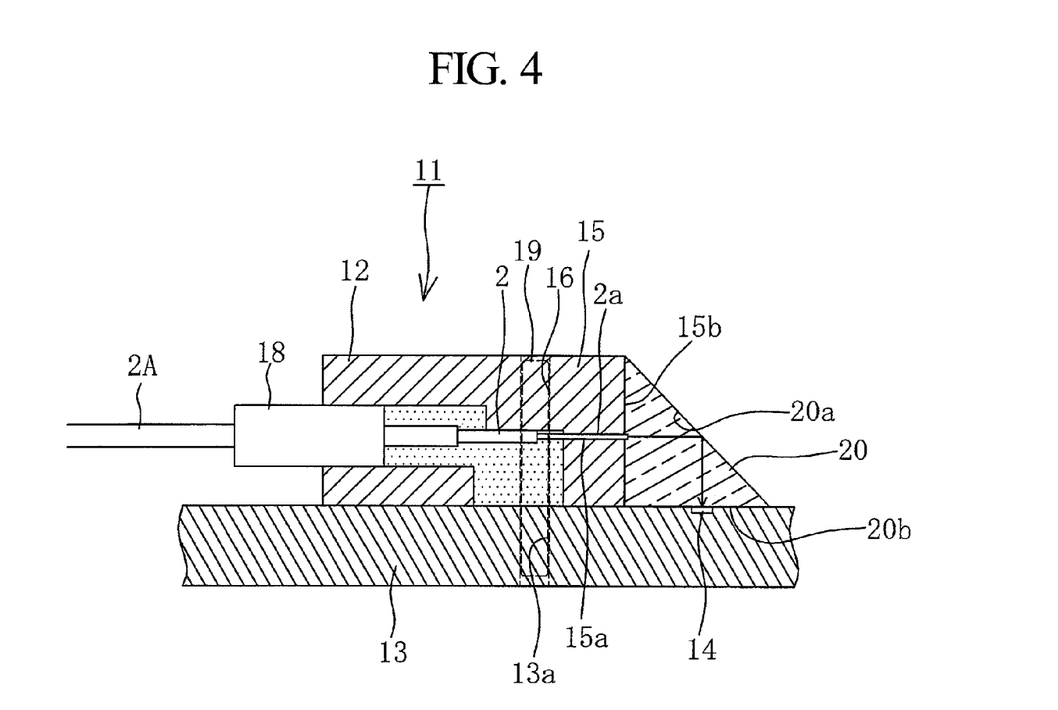
FIG. 4 is a cross-sectional view of an optical path change optical connector manufactured by over-molding light-transmitting resin in the core part of FIG. 3 having the optical fiber inserted thereinto, and provided on a circuit board.

Hereinafter, a method of manufacturing an optical path change optical connector, and an optical path change optical connector according to the present invention will be described with reference to the accompanying drawings.
First Embodiment FIGS. 1 to 4 illustrate a method of manufacturing an optical path change optical connector, and an optical path change optical connector according to a first embodiment of the present invention. FIG. 1 is a perspective view of an optical path change optical connector 11. FIG. 2 is a cross-sectional view of a core part 12 in the optical path change optical connector 11 of FIG. 1. FIG. 3 is a cross-sectional view of the core part 12 of FIG. 2 having an optical fiber inserted thereinto and fixed thereto. FIG. 4 is a cross-sectional view of an optical path change optical connector 11 manufactured by over-molding light-transmitting resin in the core part 12 of FIG. 3 having the optical fiber inserted thereinto, and provided on a circuit board 13.

An optical element 14, such as a light emitting element or a light receiving element, is mounted on the circuit board 13.

In FIGS. 3 and 4, 2A indicates an optical fiber ribbon, 2 indicates an optical fiber strand (e.g., a UV strand of 250 μmϕ) constituting the optical fiber ribbon 2A, and 2a indicates an optical fiber (bare fiber) obtained by removing a jacket of the optical fiber strand.

When this optical connector 11 is manufactured, a core part 12 is resin-molded in advance which has an optical-fiber-hole-formed portion 15 having an optical fiber hole 15a into which an optical fiber 2a is inserted, and a positioning hole (positioning structure) 16 for positioning the core part 12 with respect to the circuit board 13, as shown in FIG. 2.

Examples of a resin material of the core part 12 may include polyphenylene sulfide (PPS), silicon resin, and epoxy resin.

The optical fiber hole 15a of the shown core part 12 passes through from a forward wall surface 17c of a hollow portion 17 to a front end face 15b of the optical-fiber-hole-formed portion 15. The hollow portion 17 has an opening portion 17a for optical fiber introduction provided at a rear end of the core part (on the left in FIG. 2), and an adhesive filling window 17b.

Next, as shown in FIG. 3, the optical fiber ribbon 2A consisting of a plurality of optical fiber strands 2 is inserted into the hollow portion 17 of the core part 12 from the opening portion 17a for optical fiber introduction in a state where a jacket portion of the optical fiber ribbon 2A is covered with a rubber boot 18, and the optical fiber (bare fiber) 2a passes through the optical fiber hole 15a. In this case, a front end face of the optical fiber 2a is coplanar with a front end face 15b of the optical-fiber-hole-formed portion 15. Alternatively, the front end face of the optical fiber 2a may slightly protrude from the front end face 15b of the optical-fiber-hole-formed portion 15.

The adhesive 37 is then filled from the adhesive filling window 17b to fix the optical fibers 2 and 2a.

Light-transmitting resin is then over-molded at the front end face of the core part 12 having the optical fibers 2 and 2a inserted thereinto in FIG. 3, as shown in FIGS. 1 and 4.

In this case, the light-transmitting resin is over-molded to cover at least the front end face 15b of the optical-fiber-hole-formed portion 15 (and thus, the front end face of the optical fiber 2a) and to form an inclined face 20a that is opposite to the front end face 15b of the optical-fiber-hole-formed portion 15 and is inclined to direct an optical path of the optical fiber to the optical element 14. In this case, the inclined face 20a has an outer surface as a mirror surface, which is used as an internal reflective surface 20a.

In the example shown, the shape of the over-molded light-transmitting resin 20 is shown in a simple manner and has a simple triangular cross section with a 45° inclined surface. In fact, the light-transmitting resin 20 may have such a shape that the light-transmitting resin 20 is integrally coupled with the core part 12 reliably.

Examples of the light-transmitting resin include polycarbonate (PC), ZEONEX (amorphous cycloolefin polymer:

registered trademark), ULTEMNATURAL (polyetherimide: registered trademark), polymethyl methacrylate (PMMA), modified polyolefin, polyphenylsulfone (PPSU), and epoxy resin.

The light-transmitting resin may be injection molded.

A fine uneven structure having a reflection suppression function is formed on an input and output surface 20b of the light-transmitting resin 20 that faces the optical element 14. This fine uneven structure is a surface structure having a periodic unevenness that is shorter than a wavelength of light. The fine uneven structure is called a sub wavelength grating, and has a very high anti-reflection effect. The fine uneven structure may be formed using a mold having a fine uneven surface when the light-transmitting resin is over-molded.

A positioning hole 13a corresponding to the positioning hole 16 of the optical connector 11 is formed in the circuit board 13. Both of the positioning holes 16 and 13a are aligned in a line, and a positioning pin 19 is fitted into the positioning holes 16 and 13a to position the optical connector 11 and the optical element 14 on the circuit board 13.

When the optical element 14 is a light receiving element, light output from the optical fiber 2a is reflected 45° downward at the internal reflective surface 20a of the light-transmitting resin 20, and incident to the optical element 14.

When the optical element 14 is a light emitting element, light output upward from the optical element 14 is reflected in a horizontal direction in FIG. 4 at the internal reflective surface 20a of the light-transmitting resin 20 and incident to the end face of the optical fiber 2a.

The core part 12 in the optical path change optical connector 11 includes the optical-fiber-hole-formed portion 15 and the positioning hole (positioning structure) 16 portion for positioning the core part 12 with respect to the circuit board 13. Accordingly, when this core part 12 is accurately formed of a resin material having high rigidity, an optical path change optical connector 11 with high positioning accuracy is obtained.

Also, the core part 12 can have a simple outer shape, thus facilitating high accuracy molding.

Further, when the optical fiber is inserted into the resin pre-molded core part 12 and the light-transmitting resin 20 is over-molded, the internal reflective surface 20a for directing the optical path of the optical fiber to the optical element 14 is formed. Accordingly, an assembly process of filling transparent adhesive and sealing with the transparent glass 9, as in the conventional optical connector in FIG. 13, is unnecessary. Thus, according to the method of manufacturing an optical path change optical connector of the present embodiment, the complexity of the assembly of the optical path change optical connector can be overcome and an inexpensive optical path change optical connector can be obtained.

Further, the fine uneven structure formed on the input and output surface 20b of the light-transmitting resin 20 prevents light loss due to reflection of the light output from the optical element 14.

Since this fine uneven structure can be simultaneously formed with the light-transmitting resin 20 when the light-transmitting resin is over-molded, a separate member, i.e., the transparent glass anti-reflectively coated through a complicated process, is unnecessary. Furthermore, there is no issue of abrasion, unlike the anti-reflective coating.

Second Embodiment

Figure 5:
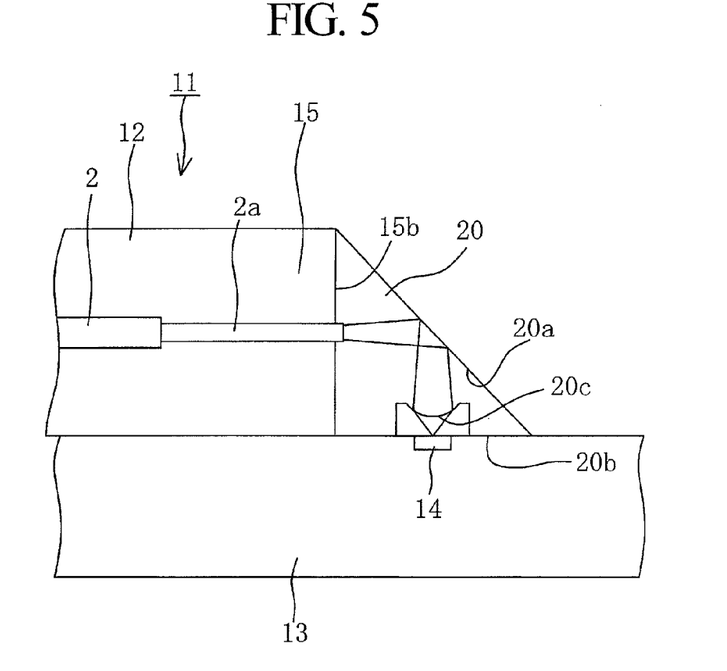
FIG. 5 is an enlarged cross-sectional view of primary portions of an optical path change optical connector having a collimator lens portion formed on an input and output surface of a light-transmitting resin portion according to a second embodiment of the present invention.

When the optical element 14 is a light receiving element, a focusing lens portion 20c may be formed on the input and output surface 20b of the light-transmitting resin 20, as shown in FIG. 5. Accordingly, the light output from the optical fiber 2a is efficiently incident to the optical element 14 without being diffused.

The above-described fine uneven structure can be formed even on the surface of the focusing lens portion 20c.

Third Embodiment

Figure 6:
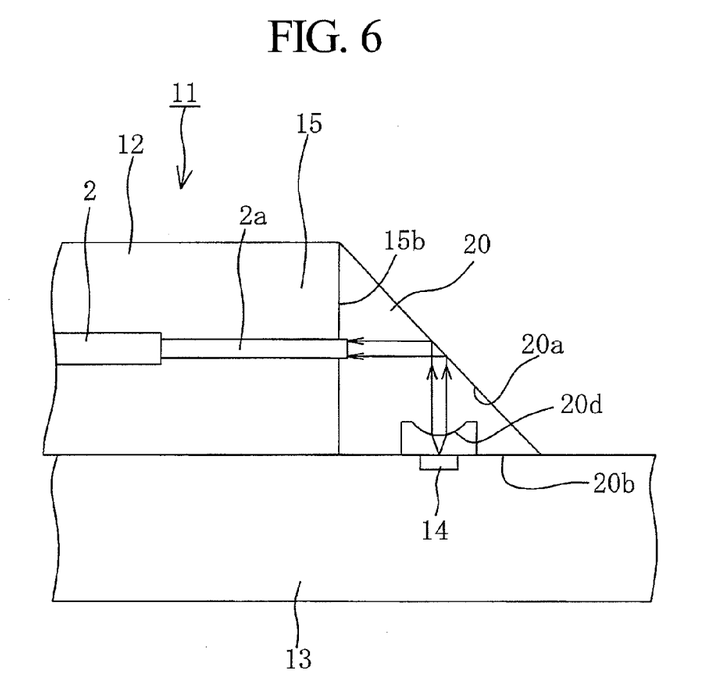
FIG. 6 is an enlarged cross-sectional view of primary portions of an optical path change optical connector having a focusing lens portion formed on an input and output surface of a light-transmitting resin portion according to a third embodiment of the present invention.

When the optical element 14 is a light emitting element, a collimator lens portion 20d may be formed on the input and output surface 20b of the light-transmitting resin 20, as shown in FIG. 6. Accordingly, light output from the optical element 14 is efficiently incident to the optical fiber 2a without being diffused.

The above-described fine uneven structure can be formed even on the surface of the collimator lens portion 20d.

Fourth Embodiment

FIGS. 7 to 12 show an optical path change optical connector 21 according to a fourth embodiment of the present invention.

Figure 7:
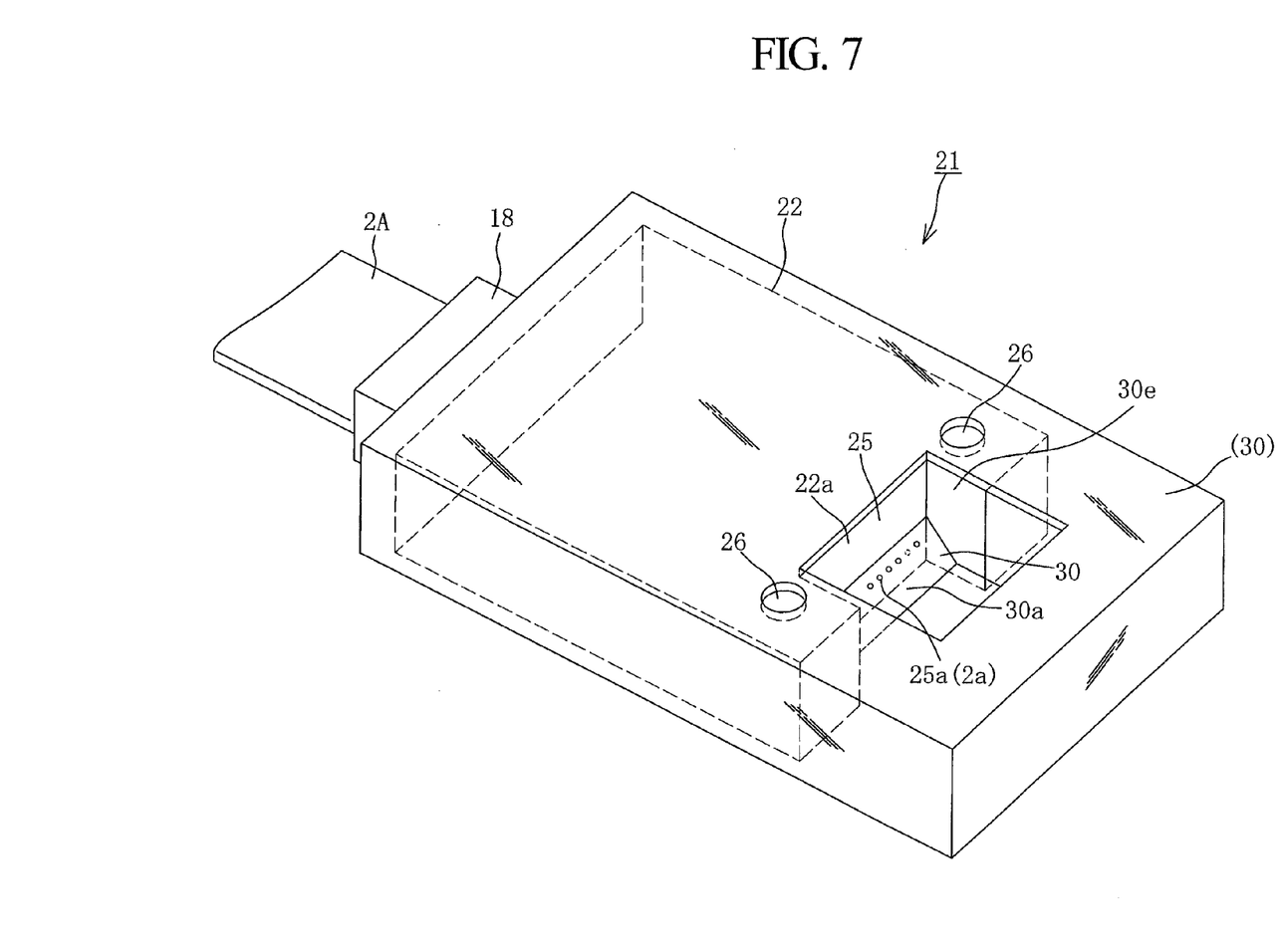
FIG. 7 is a perspective view of an optical path change optical connector according to a fourth embodiment of the present invention.
Figure 8:
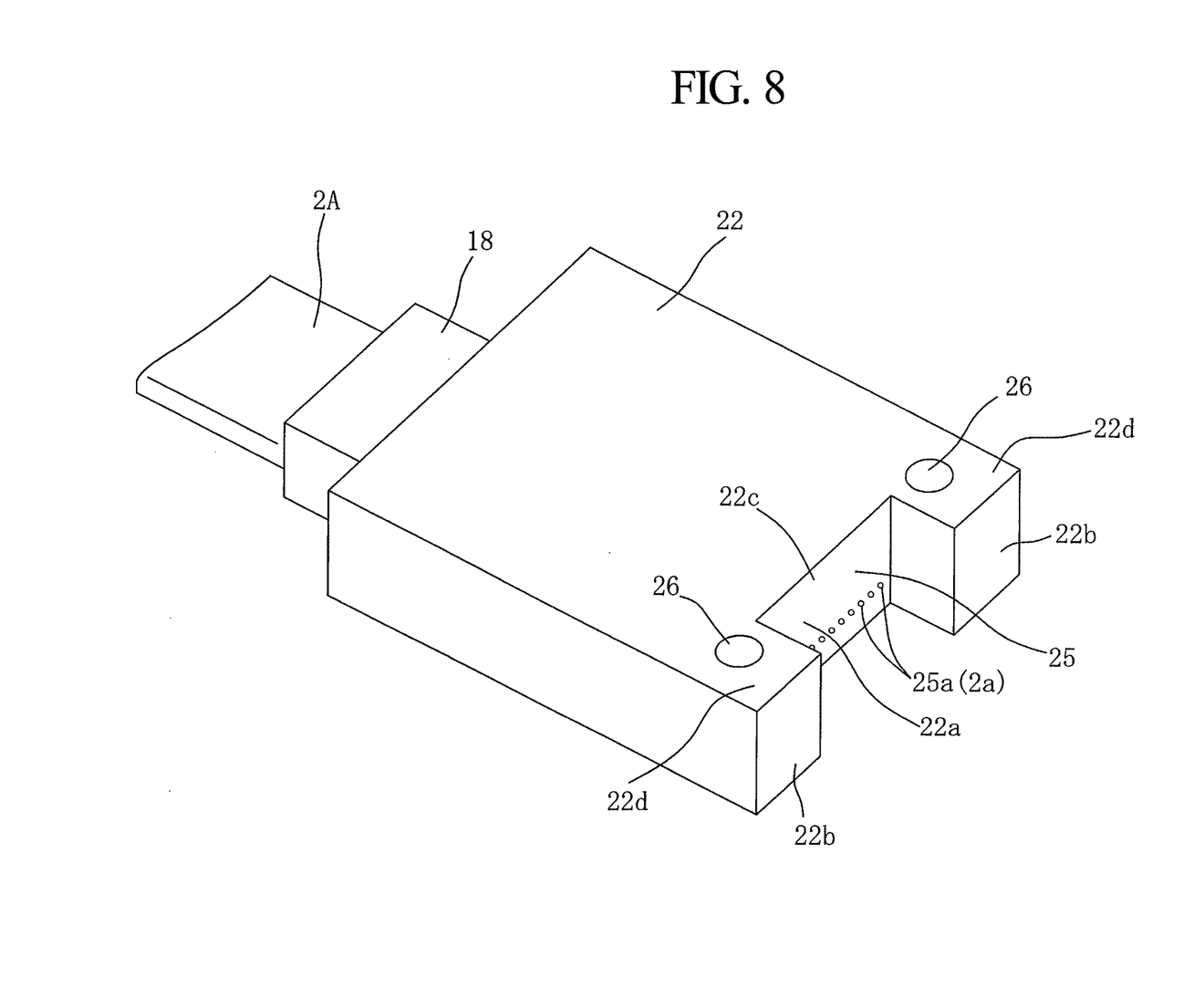
FIG. 8 is a perspective view of a core part having an optical fiber inserted thereinto and fixed thereto in the optical path change optical connector in FIG. 7.
Figure 9:
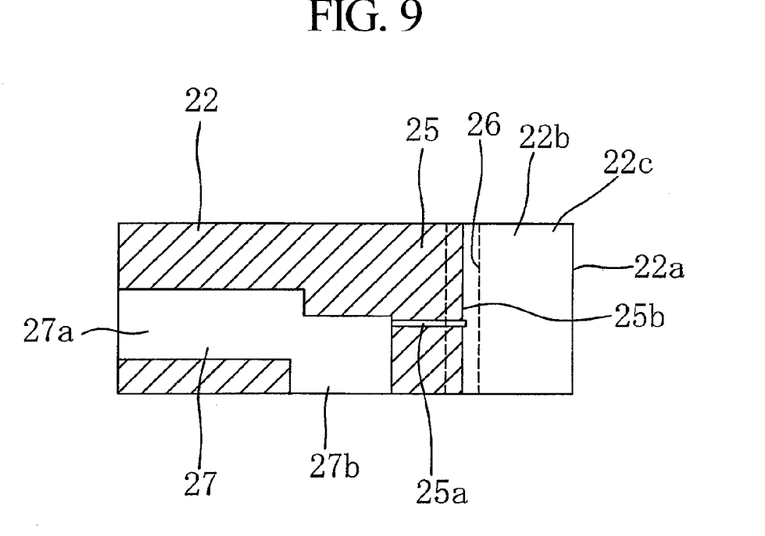
FIG. 9 is a cross-sectional view showing only the core part in FIG. 8.
Figure 10:
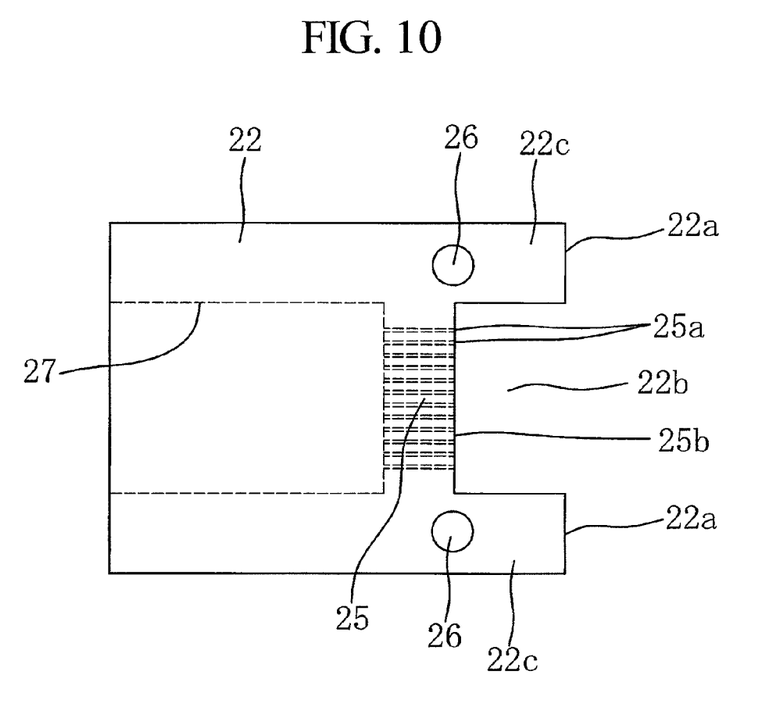
FIG. 10 is a plan view of the core part in FIG. 9.
Figure 11:
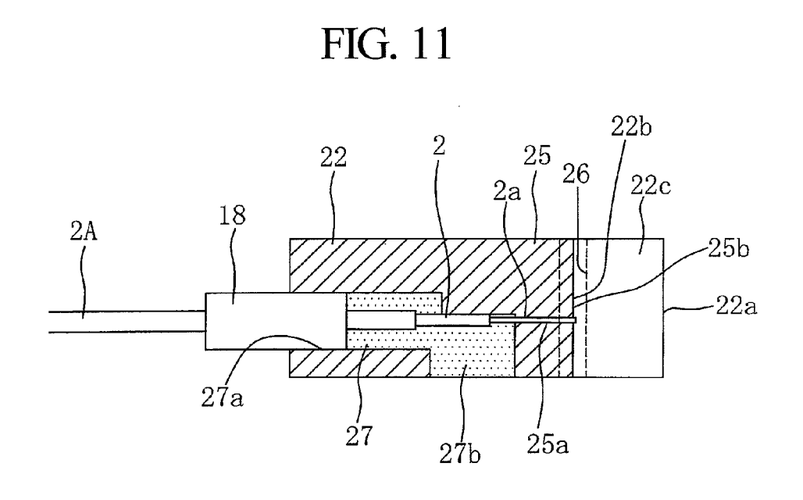
FIG. 11 is a cross-sectional view of the core part of FIG. 9 having an optical fiber inserted thereinto and fixed thereto (in a state of FIG. 8).
Figure 12:
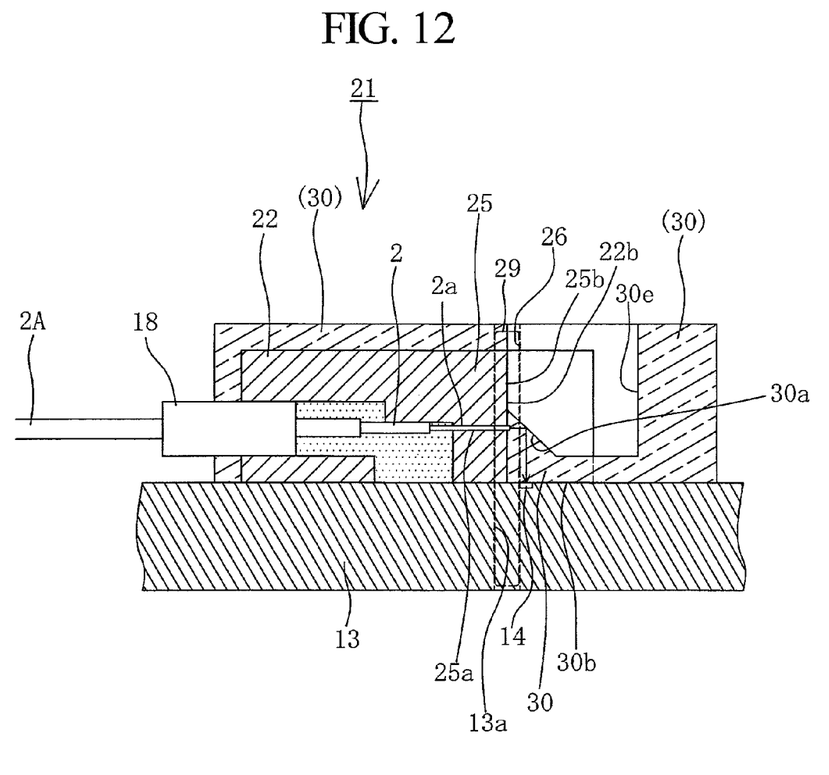
FIG. 12 is a cross-sectional view of an optical path change optical connector manufactured by over-molding light-transmitting resin in the core part of FIG. 11 having an optical fiber inserted thereto, and provided on a circuit board.

FIG. 7 is a perspective view of the optical path change optical connector 21. FIG. 8 is a perspective view of a core part 22 having an optical fiber inserted thereinto and fixed thereto in FIG. 7. FIG. 9 is a cross-sectional view of the core part 22. FIG. 10 is a plan view of the core part 22. FIG. 11 is a cross-sectional view of the core part 22 having an optical fiber inserted thereinto and fixed thereto (in a state of FIG. 8). FIG. 12 is a cross-sectional view of an optical path change optical connector 21 manufactured by over-molding light-transmitting resin in the core part 22 of FIG. 11 having an optical fiber inserted thereto, and provided on a circuit board 13. The same portions as those in FIGS. 1 to 4 are assigned the same reference numerals and a description thereof will be described.

A procedure for manufacturing the optical connector 21 is substantially the same as that described in FIGS. 1 to 4.

That is, a core part 22 is resin-molded in advance, which has an optical-fiber-hole-formed portion 25 having optical fiber holes 25a into which optical fibers 2a are inserted, and positioning hole (positioning structure) 26 for positioning the core part 22 with respect to a circuit board 13, as shown in FIGS. 8 to 10.

The core part 22 in this embodiment includes protrusions 22c formed at both sides of an optical-fiber-hole-formed portion 25 in a transverse direction of the connector. That is, a front end face 25b of the optical-fiber-hole-formed portion 25 is a recess 22b which is concave in a longitudinal direction of the core part with respect to front end faces 22a of the core part of the positioning hole (positioning structure) 26 portions at both sides of the optical-fiber-hole-formed portion 25. Centers of the positioning holes 26 are located on an extension of the front end face 25b of the optical-fiber-hole-formed portion 25, when viewed from the top, as shown in FIG. 10.

The optical fiber holes 25a of the core part 22 pass through from a forward wall surface 27c of a hollow portion 27 to the front end face 25b of the optical-fiber-hole-formed portion 25, as described above. The hollow portion 27 has an opening portion 27a for optical fiber introduction at a rear end of the core part 22 (on the left of FIG. 9), and an adhesive filling window 27b.

Next, an optical fiber ribbon 2A consisting of a plurality of optical fiber strands 2 is inserted into the hollow portion 27 of the core part 22 from the opening portion 27a for optical fiber introduction in a state where a jacket portion of the optical fiber ribbon 2A is covered with a rubber boot 18, and the optical fiber (bare fiber) 2a passes through the optical fiber hole 25a, as shown in FIGS. 8 and 11. Adhesive 37 is then filled from the adhesive filling window 27b to fix the optical fibers 2 and 2a.

Light-transmitting resin is then over-molded in the core part 22 of FIGS. 8 and 11 having the optical fibers inserted thereinto, as shown in FIGS. 7 and 12.

In this embodiment, the light-transmitting resin 30 is not only over-molded in the recess 22b at the front end side of the optical-fiber-hole-formed portion 25 to cover the front end face 25b of the optical-fiber-hole-formed portion 25 (and thus, the front end face of the optical fiber 2a) and to form an inclined face 30a that is opposite to the front end face 25b of the optical-fiber-hole-formed portion 25 and inclined to direct an optical path of the optical fiber to the optical element 14, but is also over-molded in the entire core part 22 excluding a bottom surface of the core part 22. In this case, the inclined face 30a has an outer surface as a mirror surface, which is used as an internal reflective surface 30a. A recess 30e with an opening at an upper surface thereof is formed in a light-transmitting resin 30 in which the inclined face 30a is formed, as shown in FIGS. 7 and 12.

Positioning holes 13a corresponding to the positioning holes 26 of the optical connector 21 are formed in the circuit board 13. Both of the positioning holes 26 and 13a are aligned and positioning pins 29 are fitted into the positioning holes 26 and 13a to position the optical connector 21 and the optical element 14 on the circuit board 13.

Even in this embodiment, a fine uneven structure having a reflection suppression function is formed on an input and output surface 30b of the light-transmitting resin 30 that faces the optical element 14, as in the above-described embodiment.

Further, a focusing lens portion or a collimator lens portion may be formed on the input/output surface 30b of the light-transmitting resin 30, as in FIG. 5 or 6.

In this embodiment, the over-molded light-transmitting resin 30 has a shape substantially surrounding the entire core part 22, thus making the light-transmitting resin 30 portion firmly integral with the core part 22. Further, since the light-transmitting resin 30 has the same shape as a typical optical path change optical connector of this type, the light-transmitting resin 30 is suitable in terms of compatibility with conventional products.

Further, the positioning holes 26 are provided at both sides of the front end position of the optical fiber 2a, which are suitable as positions of the positioning structures.

In the respective embodiments as described above, the positioning pin is fitted into the positioning hole 16 or 26 of the optical connector and the positioning hole 13a of the circuit board 13 to position the optical connector and the circuit board. Alternatively, the core part 12 or 22 may have a positioning fitting pin formed integrally therewith, instead of the positioning hole 16 or 26.

Alternatively, a positioning protrusion fitted into the positioning hole 16 or 26 of the optical connector may be provided on the circuit board to position the optical connector and the circuit board.

The over-molded light-transmitting resin is not limited to the shapes described in the above-described embodiments, but may have various shapes. In short, the light-transmitting resin may be over-molded to cover at least the front end face of the optical-fiber-hole-formed portion and to form the internal reflective surface that is opposite to the front end face of the optical-fiber-hole-formed portion and is inclined for directing the optical path of the optical fiber to the optical element.

While preferred embodiments of the present invention have been described, the present invention is not limited to the embodiments. Additions, omissions, substitutions, and other variations may be made to the present invention without departing from the spirit and scope of the present invention. The present invention is not limited by the above description, but by the appended claims.

What is claimed is:

1. An optical path change optical connector comprising:
a core part disposed on a circuit board, the core part comprising: an optical-fiber-hole-formed portion having an optical fiber hole, and a positioning structure portion for positioning the core part with respect to the circuit board;
an optical fiber inserted into the optical-fiber-hole, a tip end of the optical fiber protruding from a front end face of the optical-fiber-hole-formed portion; and
a light-transmitting resin portion which is over-molded over the front end face of the optical-fiber-hole-formed portion and the tip end of the optical fiber inserted into the optical fiber hole of the optical-fiber-hole-formed portion,
wherein the light-transmitting resin portion covers the tip end of the optical fiber, and comprises an internal reflective surface disposed in front of the tip end of the optical fiber, wherein the internal reflective surface is inclined and positioned to reflect light between the tip end of the optical fiber and the optical element; and an input and output surface that faces the optical element.

2. The optical path change optical connector according to claim 1, wherein the input and output surface of the light-transmitting resin comprises a fine uneven structure configured to suppress reflection.

3. The optical path change optical connector according to claim 1, wherein the input and output surface of the light-transmitting resin portion comprises a collimator lens portion formed thereon.

4. The optical path change optical connector according to claim 1, wherein the input and output surface of the light-transmitting resin portion comprises a focusing lens portion formed thereon.

5. The optical path change optical connector according to claim 1, wherein the front end face of the optical-fiber-hole-formed portion of the core part is within a recess portion of the core part that is recessed with respect to front end faces of the positioning structure portions disposed at both sides of the optical-fiber-hole-formed portion, and
the light-transmitting resin portion is over-molded within at least the recess portion of the core part.

* * * * *